United States Patent
Ito

(10) Patent No.: US 10,425,573 B2
(45) Date of Patent: Sep. 24, 2019

(54) AUTOMATIC FOCUS ADJUSTMENT DEVICE AND AUTOMATIC FOCUS ADJUSTMENT CONTROL DEVICE

(71) Applicant: OLYMPUS CORPORATION, Tokyo (JP)

(72) Inventor: Kazumi Ito, Tokyo (JP)

(73) Assignee: OLYMPUS CORPORATION, Tokyo (JP)

(*) Notice: Subject to any disclaimer, the term of this patent is extended or adjusted under 35 U.S.C. 154(b) by 0 days.

(21) Appl. No.: 15/680,626

(22) Filed: Aug. 18, 2017

(65) Prior Publication Data

US 2017/0347019 A1 Nov. 30, 2017

Related U.S. Application Data

(63) Continuation of application No. PCT/JP2015/059410, filed on Mar. 26, 2015.

(30) Foreign Application Priority Data

Feb. 19, 2015 (JP) ................... 2015-030771

(51) Int. Cl.
*H04N 5/232* (2006.01)
*G02B 7/28* (2006.01)
(Continued)

(52) U.S. Cl.
CPC .......... *H04N 5/23212* (2013.01); *G02B 7/14* (2013.01); *G02B 7/28* (2013.01); *G02B 7/38* (2013.01); *H04N 5/23209* (2013.01)

(58) Field of Classification Search
CPC .. H04N 5/23212; H04N 5/23209; G02B 7/14; G02B 7/28
See application file for complete search history.

(56) References Cited

U.S. PATENT DOCUMENTS

2011/0032411 A1* 2/2011 Hirai .................. G02B 7/36
348/345

FOREIGN PATENT DOCUMENTS

JP    H11-337809 A    12/1999
JP    2006-349744 A   12/2006
(Continued)

OTHER PUBLICATIONS

English translation of International Preliminary Report on Patentability dated Aug. 31, 2017 together with the Written Opinion in related International Application No PCT/JP2015/059410.

(Continued)

*Primary Examiner* — Twyler L Haskins
*Assistant Examiner* — Fayez Bhuiyan
(74) *Attorney, Agent, or Firm* — Scully, Scott, Murphy & Presser, P.C.

(57) ABSTRACT

A device having: an optical system configured to be controlled to adjust a focal position so as to focus in an adjustment range; a switch configured to be switched between a first state and a second state; and a processor comprising hardware, wherein the processor is configured to implement: a focal position adjustment range setting unit configured to set: the adjustment range to a whole region in the first state; and the adjustment range to a part of the whole region in the second state, wherein the part of the whole region as a predetermined range is determined from a focal position of an object point conjugate with an imaging surface at the time the first switch is switched to the second state; and a controller configured to control the optical system to adjust the focal position based on the set adjustment range.

14 Claims, 8 Drawing Sheets

(51) Int. Cl.
   *G02B 7/14*   (2006.01)
   *G02B 7/38*   (2006.01)

(56)          References Cited

FOREIGN PATENT DOCUMENTS

JP      2011-091664 A      5/2011
JP      2013-148788 A      8/2013
JP      2015-064523 A      4/2015

OTHER PUBLICATIONS

International Search Report dated Jun. 30, 2015 issued in PCT/JP2015/059410.

* cited by examiner

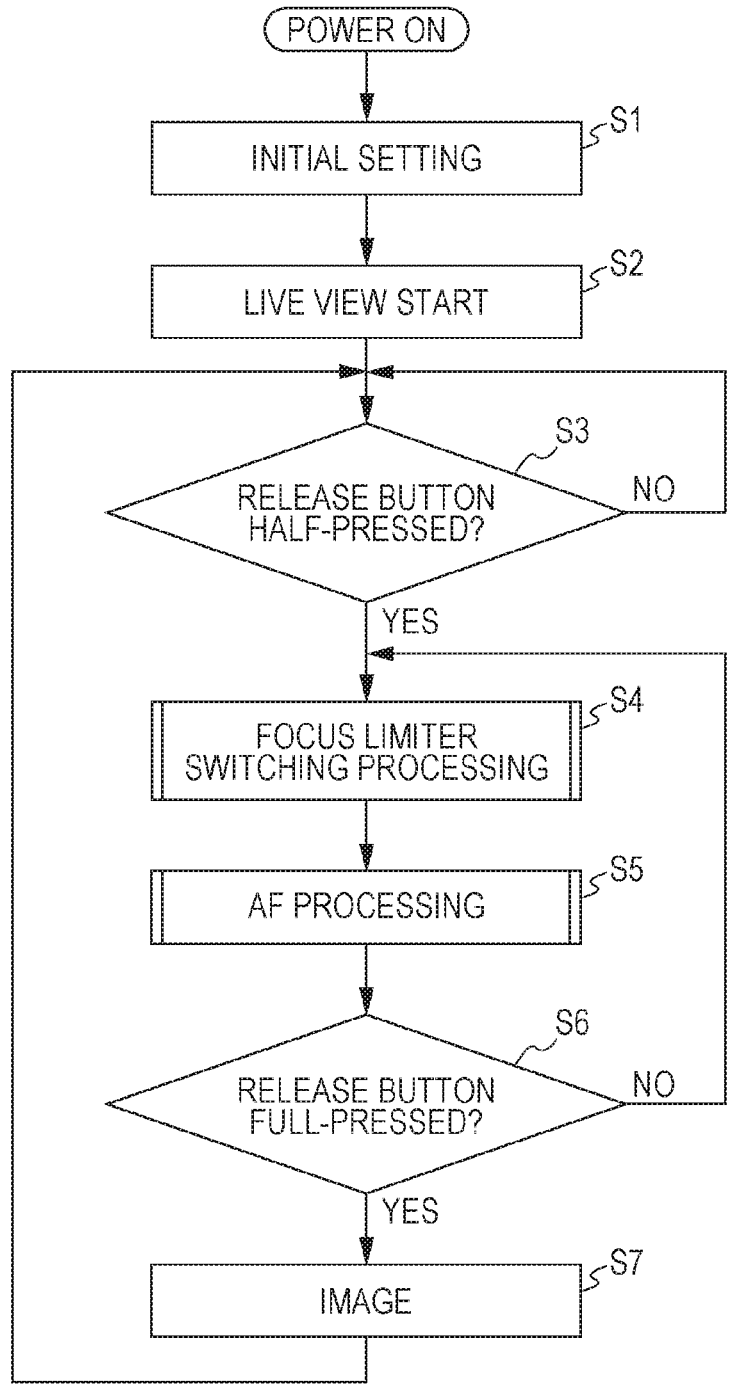

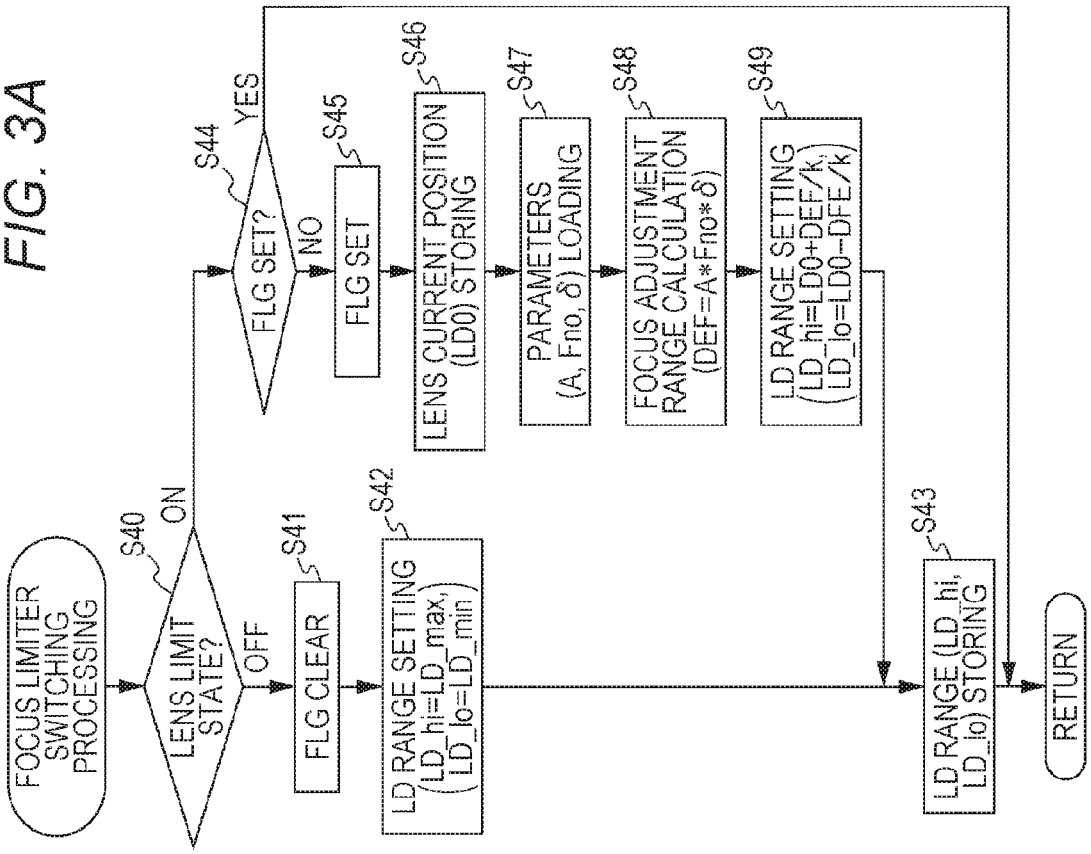
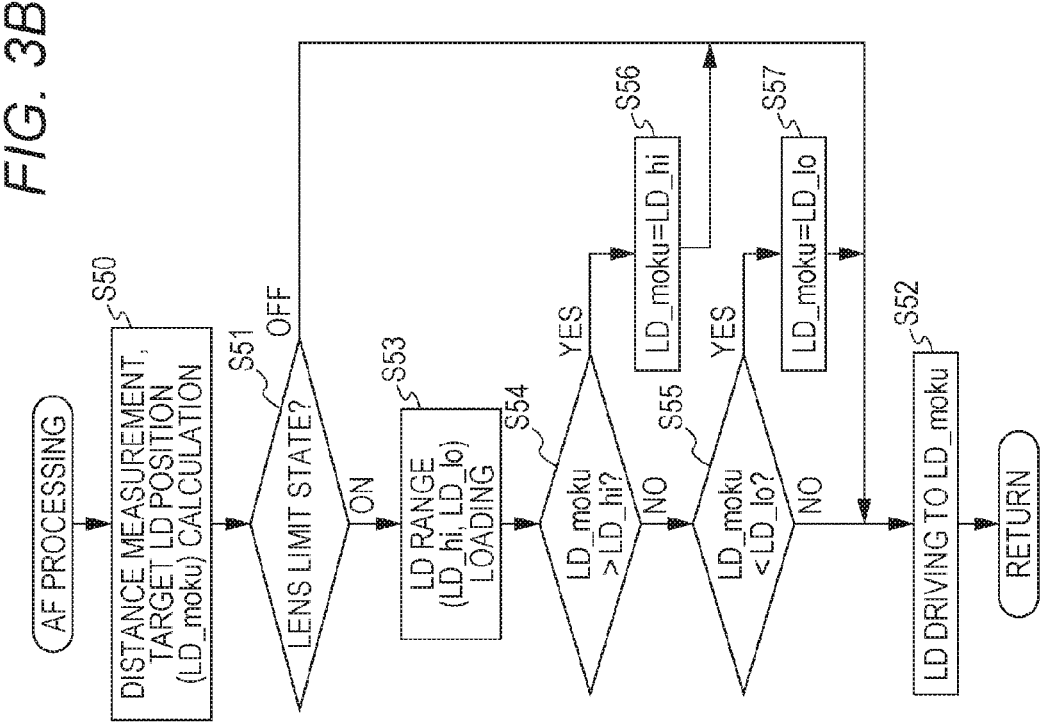

FIG. 6A

| EXAMPLE IN 300mm F2.8 TELEPHOTO FL(mm)=300, Fno=2.8, $\delta$(mm)=0.03, Fno*$\delta$=0.084, A=50, DFE AMOUNT(mm)=4.2 | | | | |
|---|---|---|---|---|
| REFERENCE OBJECT POINT(IO) | MAGNIFICATION | EXTENDING POSITION | NEAR POINT(N) | FAR POINT(F) |
| INF | 0 | 0 | 22.03 | ∞ |
| 20 | 1/84.7 | 4.64 | 10.78 | 205.01 |
| 10 | 1/31.3 | 9.58 | 7.13 | 17.32 |
| 5 | 1/14.6 | 20.55 | 4.24 | 6.10 |
| 2.5 | 1/8.2 | 48.61 | 2.30 | 2.63 |
| (mm) | (x) | (mm) | (m) | (m) |

FIG. 6B

| EXAMPLE IN 400mm F2.8 TELEPHOTO FL(mm)=400, Fno=2.8, $\delta$(mm)=0.03, Fno*$\delta$=0.084, A=30, DFE AMOUNT(mm)=2.52 | | | | |
|---|---|---|---|---|
| REFERENCE OBJECT POINT(IO) | MAGNIFICATION | EXTENDING POSITION | NEAR POINT(N) | FAR POINT(F) |
| INF | 0 | 0 | 64.29 | ∞ |
| 20 | 1/48.0 | 8.34 | 15.54 | 28.31 |
| 10 | 1/23.0 | 17.42 | 8.82 | 11.54 |
| 5 | 1/10.4 | 38.45 | 4.71 | 5.25 |
| 2.5 | 1/4.0 | 100.00 | 2.36 | 2.44 |
| (mm) | (x) | (mm) | (m) | (m) |

FIG. 6C

| EXAMPLE IN 200mm F2 MACRO FL(mm)=200, Fno=2, $\delta$(mm)=0.03, Fno*$\delta$=0.06, A=50, DFE AMOUNT(mm)=3 | | | | |
|---|---|---|---|---|
| REFERENCE OBJECT POINT(IO) | MAGNIFICATION | EXTENDING POSITION | NEAR POINT(N) | FAR POINT(F) |
| INF | 0 | 0 | 13.73 | ∞ |
| 8 | 1/38.0 | 5.27 | 5.24 | 18.05 |
| 4 | 1/17.9 | 11.15 | 3.23 | 5.31 |
| 2 | 1/7.9 | 25.40 | 1.81 | 2.19 |
| 1 | 1/2.6 | 76.39 | 0.90 | 0.95 |
| (mm) | (x) | (mm) | (m) | (m) |

FIG. 6D

| EXAMPLE IN 100mm F2 MACRO FL(mm)=100, Fno=2, $\delta$(mm)=0.03, Fno*$\delta$=0.06, A=50, DFE AMOUNT(mm)=3 | | | | |
|---|---|---|---|---|
| REFERENCE OBJECT POINT(IO) | MAGNIFICATION | EXTENDING POSITION | NEAR POINT(N) | FAR POINT(F) |
| INF | 0 | 0 | 3.53 | ∞ |
| 2 | 1/17.9 | 5.57 | 1.37 | 4.09 |
| 1 | 1/7.9 | 12.70 | 0.84 | 1.23 |
| 0.5 | 1/2.6 | 38.20 | 0.44 | 0.48 |
| 0.4 | 1/1.0 | 100.00 | 0.30 | 0.30 |
| (mm) | (x) | (mm) | (m) | (m) |

FIG. 6E

| EXAMPLE IN 100mm F3.5 MACRO FL(mm)=100, Fno=3.5, $\delta$(mm)=0.03, Fno*$\delta$=0.105, A=50, DFE AMOUNT(mm)=5.25 | | | | |
|---|---|---|---|---|
| REFERENCE OBJECT POINT(IO) | MAGNIFICATION | EXTENDING POSITION | NEAR POINT(N) | FAR POINT(F) |
| INF | 0 | 0 | 2.10 | ∞ |
| 2 | 1/17.9 | 5.57 | 1.12 | 31.18 |
| 1 | 1/7.9 | 12.70 | 0.76 | 1.54 |
| 0.5 | 1/2.6 | 38.20 | 0.43 | 0.50 |
| 0.4 | 1/1.0 | 100.00 | 0.30 | 0.31 |
| (mm) | (x) | (mm) | (m) | (m) |

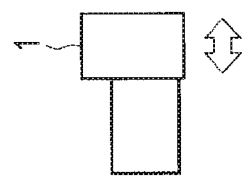 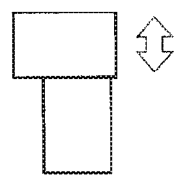 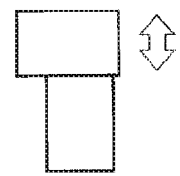
  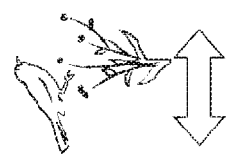
  
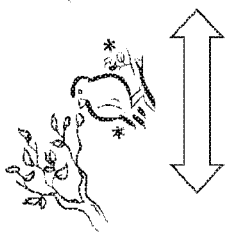  
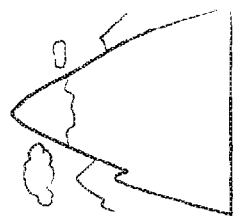 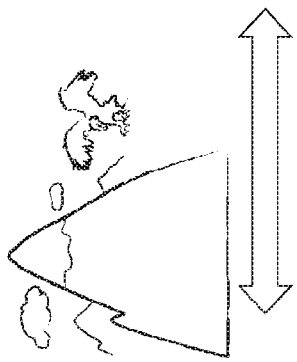 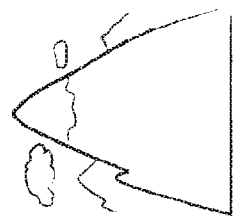
FIG. 7A  FIG. 7B  FIG. 7C

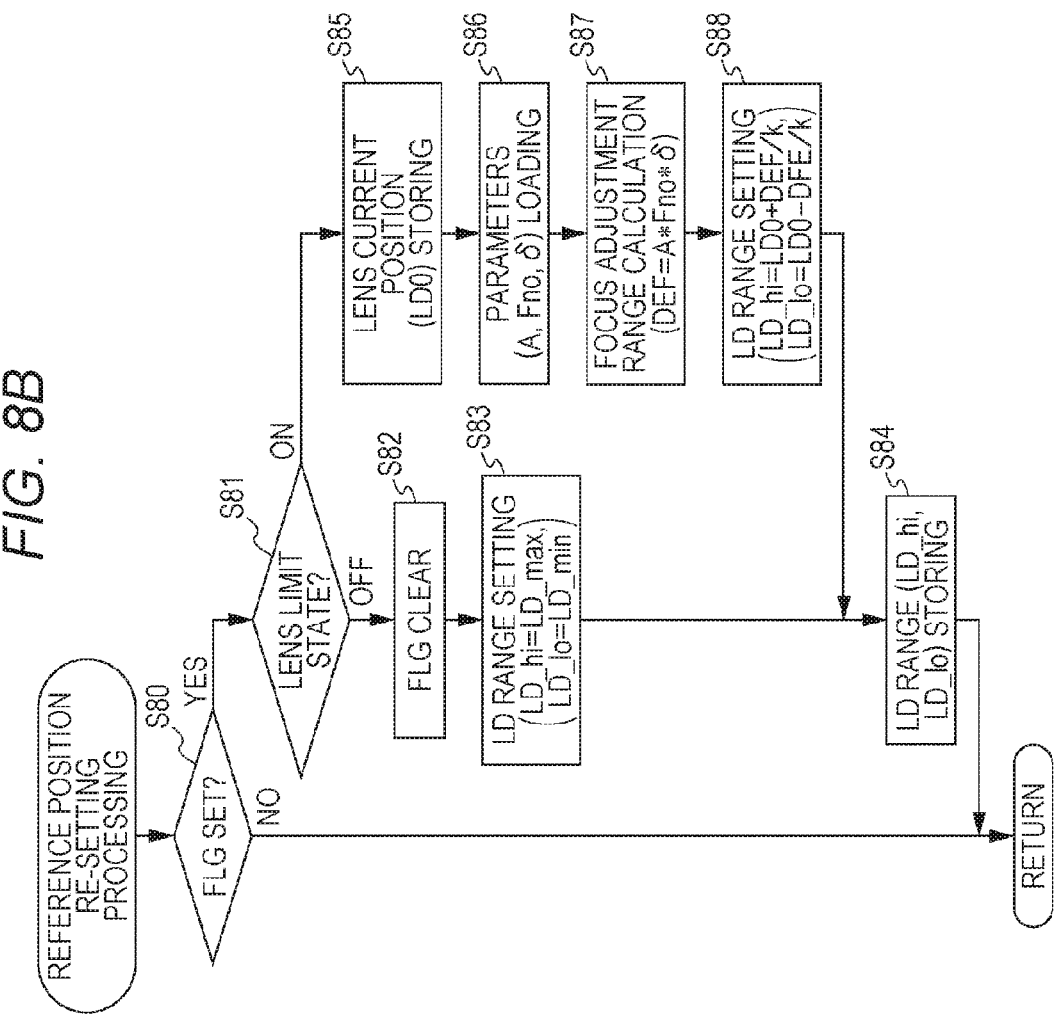
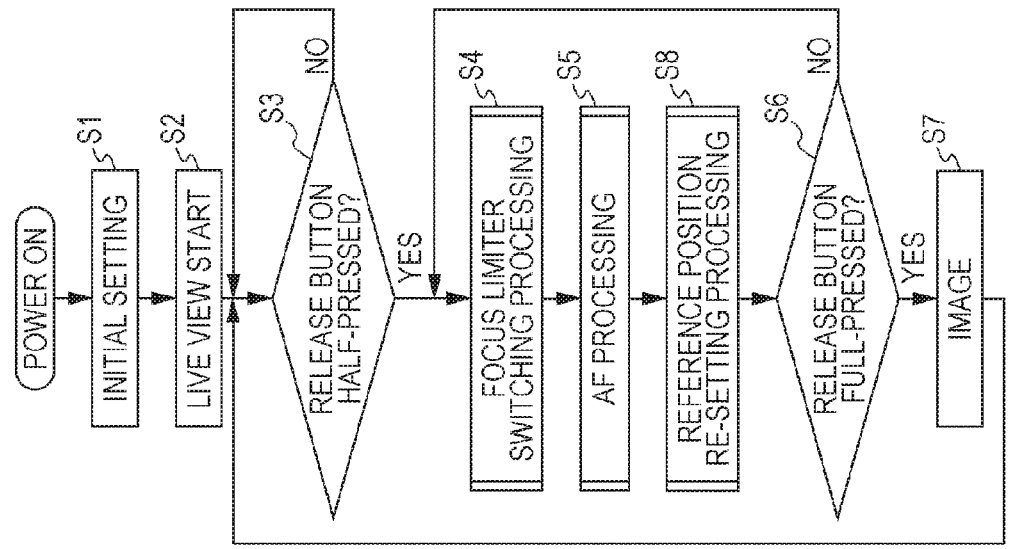

AUTOMATIC FOCUS ADJUSTMENT DEVICE AND AUTOMATIC FOCUS ADJUSTMENT CONTROL DEVICE

CROSS-REFERENCE TO RELATED APPLICATION

The present application is a continuation application of PCT Application No. PCT/JP2015/059410, filed Mar. 26, 2015 and is based upon and claims the benefit of priority from the prior Japanese Patent Application No. 2015-030771, filed on Feb. 19, 2015, the entire contents of each of which are incorporated herein by reference.

BACKGROUND

Field of the Invention

The present invention relates to an automatic focus adjustment device and an automatic focus adjustment control device in an imaging apparatus, and in particular, relates to a technology related to the control of the focus adjustment range.

Description of the Related Art

In an interchangeable lens and the like having a long focal length, used in an interchangeable lens camera system, there has been a device including a selector switch and having a function limiting the adjustment range of the focal position, referred to as "focus limit".

For example, in Japanese Patent Publication Laid-Open No. H11-337809, the following lens movement control device is disclosed. That is, the lens movement control device includes a lens moving means for moving the focusing lens group of the imaging lens along the optical axis, an electrical selector switch for determining the focusing region being a movable range of the focusing lens group, and a distance information detecting means for electrically detecting the distance information about the position of the focusing lens group on the optical axis, and the lens moving means moves the focusing lens group in the focusing region based on the distance information and the focusing region.

SUMMARY

The conventional focus limit function divides the object point distance region from infinity to close range into two to three parts, sets each of the object point distance region as an adjustment region, and operates so as to perform the focus adjustment only in the selected one adjustment region. In this case, the range of the object point distance of each adjustment region is fixed, and the operator selects which adjustment region to use by using a switch. Therefore, at a switching point of this adjustment range, one of the adjustment ranges has to be selected, and the vicinity of the switching point has been a point hard to be used.

In addition, when the number of the adjustment ranges is increased, the selecting operation of the operator becomes complicated and hard to select, and therefore, further fragmentation of the adjustment range has been difficult. Therefore, in the case of a super telephoto lens or a macro lens, images have been sometimes blurred largely even in a limited adjustment range.

The present invention has an object to provide an automatic focus adjustment device and an automatic focus adjustment control device where the adjustment range of the focal position can be set to any region, and an image is not largely blurred in the adjustment range of the focal position.

One aspect of the present invention is to provide an automatic focus adjustment device including: a first operation unit switchable to a first state not limiting an adjustment range of a focal position and a second state limiting an adjustment range of a focal position; an adjustment range setting unit of a focal position configured to set an adjustment range of a focal position to a whole region when switched to the first state by the first operation unit, and to set an adjustment range of a focal position to a part of the region when switched to the second state; and an optical system configured to adjust a focal position so as to focus in a range set by the adjustment range setting unit of the focal position, wherein the adjustment range setting unit of the focal position sets the part of the region in a predetermined range by setting a state when switched to the second state by the first operation unit as a reference state, with reference to a focal position of the optical system in an imaging position of an object point conjugate with an imaging plane in the reference state.

Another aspect of the invention is to provide an automatic focus adjustment control device including: an adjustment range setting unit of a focal position configured to set an adjustment range of a focal position to a whole region when switched to the first state in response to an instruction from a first operation unit switchable to a first state not limiting the adjustment range of the focal position and a second state limiting the adjustment range of the focal position, and to set the adjustment range of the focal position to a part of the region when switched to the second state; and a control command output unit configured to output a control command to an optical system adjusting a focal position so as to focus in a range set by the adjustment range setting unit of the focal position, wherein the adjustment range setting unit of a focal position sets the part of the region in a predetermined range by setting a state when switched to the second state in response to an instruction from the first operation unit as a reference state, with reference to a focal position of the optical system in an imaging position of an object point conjugate with an imaging plane in the reference state.

Another aspect of the present invention is to provide an automatic focus adjustment device comprising: an optical system configured to be controlled to adjust a focal position so as to focus in an adjustment range; a first switch configured to be switched between a first state and a second state; and a processor comprising hardware, wherein the processor is configured to implement: a focal position adjustment range setting unit configured to set: the adjustment range of the focal position to a whole region in the first state; and the adjustment range of the focal position to a part of the whole region in the second state, wherein the focal position adjustment range setting unit is configured to determine the part of the whole region as a predetermined range from a focal position of an object point conjugate with an imaging surface at the time the first switch is switched to the second state; and a controller configured to control the optical system to adjust the focal position based on the set adjustment range.

Another aspect of the present invention is to provide an automatic focus adjustment control device for operating an optical system configured to be controlled to adjust a focal position so as to focus in an adjustment range based on a state of a first switch configured to switch between a first state and a second state, wherein the automatic focus adjustment control device comprises: a processor comprising hardware, wherein the processor is configured to implement:

a focal position adjustment range setting unit configured to set: the adjustment range of the focal position to a whole region in the first state; and the adjustment range of the focal position to apart of the whole region in the second state, wherein the focal position adjustment range setting unit is configured to determine the part of the whole region as a predetermined range from a focal position of an object point conjugate with an imaging surface at the time the first switch is switched to the second state; and a controller configured to control the optical system to adjust the focal position based on the set adjustment range.

Another aspect of the present invention is to provide a computer-readable storage device storing instructions for operating an optical system configured to be controlled to adjust a focal position so as to focus in an adjustment range based on a state of a first switch configured to be switched between a first state and a second state, wherein the instructions, when executed by at least one processor, causes the processor to: set: the adjustment range of the focal position to a whole region in the first state; and the adjustment range of the focal position to a part of the whole region in the second state, wherein the part of the whole region as a predetermined range is determined from a focal position of an object point conjugate with an imaging surface at the time the first switch is switched to the second state; and control the optical system to adjust the focal position based on the set adjustment range.

According to the various aspects of the present invention, it is possible to provide an automatic focus adjustment device and an automatic focus adjustment control device where the adjustment range of the focal position is set in a predetermined range with reference to the focal position of the optical system when switched to the second state, and therefore, the focus adjustment range can be set in any region, and furthermore, the adjustment range of the focal position is set in a predetermined range with reference to the focal position of the optical system when switched to the second state, rather than the object point distance region, and therefore, the image is not blurred largely in the adjustment range of the focal position.

BRIEF DESCRIPTION OF THE DRAWINGS

FIG. 2 is a diagram showing a flowchart for illustrating the operation of the imaging apparatus in the first embodiment;

FIG. 3A is a diagram illustrating a flowchart of the focus limiter switching processing, and FIG. 3B is a diagram illustrating a flowchart of the AF processing in FIG. 2;

FIG. 4B is a schematic diagram for illustrating the moving range of the optical system when switched to the second state of lens limit state ON;

FIGS. 6A to 6E are each a diagram showing a calculation example of the adjustment range of the focal position.

FIGS. 7A to 7C are each a schematic diagram for illustrating the adjustment range of the focal position to be any region; and FIG. 8A is a diagram showing a flowchart for illustrating the operation of the imaging apparatus in the second embodiment of the present invention, and FIG. 8B is a diagram showing a flowchart of the reference position re-setting processing in FIG. 8A.

DETAILED DESCRIPTION

First Embodiment

Figure 1:
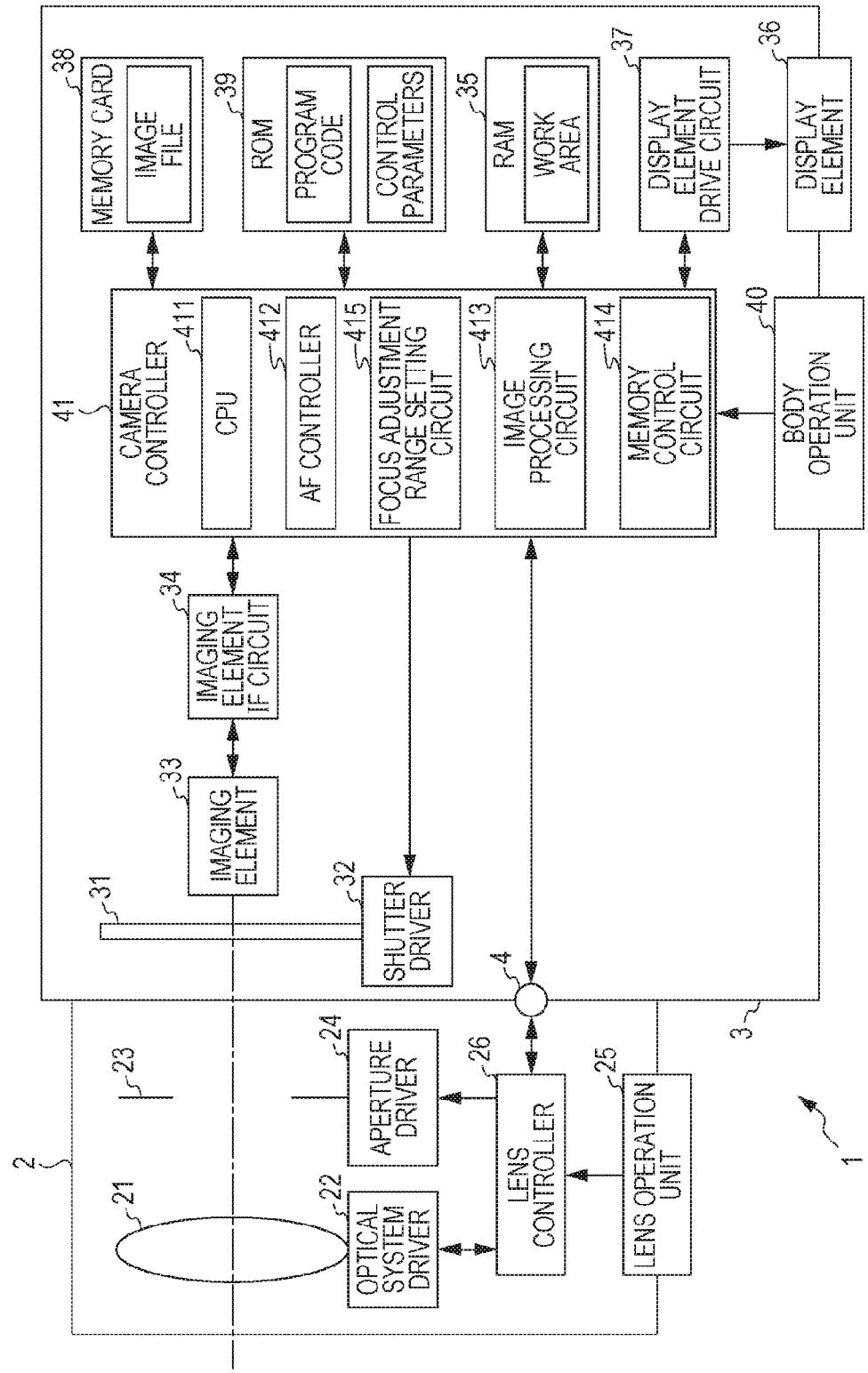
FIG. 1 is a block diagram illustrating an exemplary configuration of an imaging apparatus where the automatic focus adjustment device and automatic focus adjustment control device according to a first embodiment of the present invention is applied.

FIG. 1 is a block diagram illustrating an exemplary configuration of an imaging apparatus where the automatic focus adjustment device and automatic focus adjustment control device according to a first embodiment of the present invention is applied.

The imaging apparatus 1 can include a configuration where the interchangeable lens 2 is attached to the camera body 3. It should be noted that the camera body 3 can include the interchangeable lens 2 detachably, and that the mounting of the interchangeable lens 2 on the camera body 3 can be performed by a lens mount connector (not shown) disposed in the interchangeable lens 2 and a body mount connector (not shown) disposed in the camera body 3 being mutually fit together. Thereby, when the interchangeable lens 2 is fixed to the camera body 3, terminals disposed in each of the mount connectors can be also electrically connected to each other, and the communication between the interchangeable lens 2 and the camera body 3 can be made possible through the contact 4.

It should be noted that in this embodiment, although the imaging apparatus 1 is set as the lens interchangeable camera where the interchangeable lens 2 and the camera body 3 are disposed as separate bodies as described above, it is obvious that the present invention is not limited thereto, and is similarly applicable also to the lens integral imaging apparatus where the lens is integrally disposed in the camera body 3. In this case, the lens integral imaging apparatus may not include the above-described lens mount connecting portion, body mount connecting portion, and contact 4.

The interchangeable lens 2 can include an optical system 21, an optical system actuator 22, an aperture 23, an aperture actuator 24, a lens operation device 25, and a lens controller 26.

The optical system 21 can converge the light flux incident from the object being in front of the imaging apparatus 1, that is, the object which the photographer sets as the imaging target, and forms the object image (optical image) on the imaging plane of the imaging sensor 33 in the camera body. It should be noted that the optical system 21 may include, in addition to the focal position adjustment lens group (not shown) (hereinafter referred to as "focus lens"), the focal length adjusting lens group (not shown as well) (hereinafter referred to as "zoom lens"). The lens constituting the optical system is not specifically limited.

The optical system actuator 22 can include a motor, its drive circuit, and the like, and can move the focus lens and the zoom lens included in the optical system 21 in the optical axis direction (shown as a one-dot chain line direction in the figure) under the control of the lens controller 26. Thereby, the focal position adjustment (hereinafter referred to as "focusing") and the focal length adjustment (hereinafter referred to as "zooming") are performed. In addition, the optical system actuator 22 also can include the focus lens position detection circuit configured to detect the focus lens position by counting the number of pulses of the LDPI (Lens Drive Photo Interrupter) outputting a pulse in response to the focusing lens being extended.

The aperture 23 can include, for example, an aperture blade varying the opening size of the hole, and can adjust the amount of the light flux incident on the imaging plane through the hole.

The aperture actuator 24 can include a driving mechanism for driving the aperture 23, and can drive the aperture blades of the aperture 23 under the control of the lens controller 26.

The lens operation device 25 can include a lens limit switch being an operating member operated by the user, and can transmit an operation signal corresponding to the operation to the lens controller 26. The lens limit switch can be used to instruct the switching between the first state, not limiting the adjustment range of the focal position, being the lens limit state OFF and the second state, limiting the adjustment range of the focal position, being the lens limit state ON. It should be noted that the lens operation device 25 can be omitted when the operating member having the same function is disposed in the camera body 3.

The lens controller 26 can be constituted by a CPU (Central Processing Unit) or an ASIC (Application Specific Integrated Circuit), can communicate with the camera controller 41 in the camera body 3 through the contact 4, and can control the whole operation of the interchangeable lens 2. For example, the lens controller 26 can transmit the information indicating the current focus lens position to the camera controller 41, can receive the information indicating the focus lens position to be the target, and can control the focusing by controlling the optical system actuator 22 in accordance with the focus lens position to be the target. In addition, the lens controller 26 can transmit the information indicating the lens limit state to be instructed to switch by the lens operation device 25 to the camera controller 41.

The camera body 3 can include a shutter 31, a shutter actuator 32, an imaging sensor 33, an imaging sensor interface (IF) circuit 34, a RAM 35, a display 36, a display drive circuit 37, a memory card 38, a ROM 39, a body operation device 40, and a camera controller 41. However, a built-in memory and the like may be employed instead of the memory card 38.

The shutter 31 can be disposed in front of the imaging sensor 33, and can be configured so as to set the imaging surface of the imaging sensor 33 as the light shielding state or exposure state. The exposure time of the imaging sensor 33 can be adjusted by the shutter 31.

The shutter actuator 32 can drive the shutter 31 under the control of the CPU 411 in the camera controller 41.

The imaging sensor 33 can include an imaging surface on which the imaging light flux condensed through the optical system 21 from the object is imaged, and as an example of the imaging sensor 33, a CMOS sensor, or a CCD can be mentioned. The imaging surface of the imaging sensor 33 can include a plurality of pixels arranged two-dimensionally. In addition, a color filter can be disposed on the light incidence side of the imaging surface. In such a configuration, the imaging sensor 33 can convert an image (object image) corresponding to the imaging light flux imaged on the imaging surface into an electric signal (analog image signal) in accordance with the light quantity (photoelectric conversion).

The optical axis of the optical system 21 can be adjusted in the stage of design and manufacturing so as to coincide with the imaging surface center of the imaging sensor 33.

The imaging sensor IF circuit 34 functioning as the imaging unit along with the optical system 21 and the imaging sensor 33 can drive the imaging sensor 33 under the control of the CPU 411 in the camera controller 41. In addition, the imaging sensor IF circuit 34 can read out the analog image signal obtained by the imaging sensor 33 under the control of the CPU 411 in the camera controller 41, and can perform the analog processing such as CDS (Correlated Double Sampling) processing and AGC (Automatic Gain Control) processing on the read analog image signal. Furthermore, the imaging sensor IF circuit 34 can convert an analog-processed image signal to a digital image signal (hereinafter referred to as "image data").

The RAM 35 can be, for example, a SDRAM, and can include a work area as a storage area. The work area can be a storage area provided in the RAM 35 so as to temporarily store the data generated in each part of the imaging apparatus 1 such as the image data obtained by the imaging sensor IF circuit 34.

The display 36 can be, for example, a liquid crystal display (LCD) provided on the back plane of the camera body 3, and can display various images such as an image for live view and an image recorded on the memory card 38. Here, the display 36 can be configured to be tiltable toward the side of the photographer.

The display drive circuit 37 can drive the display 36 based on the image data input from the CPU 411 of the camera controller 41 in order to display an image on the display 36.

The memory card 38 can be a recording medium on which an image file obtained by the photographing operation is recorded. The image file can be a file configured by a predetermined header being given to the image data. The data and the like indicating the imaging conditions can be recorded on the header as the tag data. The memory card 38 can be, for example, assumed to be the one configured detachably in the imaging apparatus 1, and in this case, may not include a configuration specific to the imaging apparatus 1.

The ROM 39 can store the program code for the CPU 411 of the camera controller 41 performing various kinds of processing. In addition, the ROM 39 can store various kinds of control parameters such as the control parameters required for the operation of the optical system 21, the aperture 23, the imaging sensor 33, and the like, and the control parameters required for the image processing in the image processing circuit 413 of the camera controller 41.

The body operation device 40 can include various kinds of operating members to be operated by the user. As the body operation device 40, for example, a release button, a moving image button, a mode button, a selection key, a power button, and the like can be included. In addition, a lens limit switch can be included.

The release button can be an operating member for instructing a still image imaging. The release button may be a two-stage button having the half-pressed state being a shallow pressing referred to as "first release (1stR)" and the full-pressed state being a deep pressing referred to as "second release (2ndR)", and may output an instruction signal corresponding to the pressed state to the camera controller 41. The half-press of the release button can correspond to an instruction of the AF operation, and the full-press can correspond to an instruction of the imaging operation.

The moving image button can be an operating member for instructing a moving image imaging. The moving image imaging can be started by this moving image button being operated, and thereafter the moving image imaging can be finished by the moving image button being operated again.

The mode button can be an operating member for selecting the imaging setting of the imaging apparatus 1.

The selection key can be, for example, an operating member for selecting and determining the items on the menu screen. When the selection key is operated by the user, the selection and determination of the items on the menu screen can be made.

The power button can be an operating member for turning ON or OFF the power of the imaging apparatus. When the power button is operated by the user, the imaging apparatus 1 can be activated and can become an operable state. When the power button is operated while the imaging apparatus 1 is activated, the imaging apparatus 1 can become a power-saving standby state.

The lens limit switch can be used to instruct the switching between the first state, not limiting the adjustment range of the focal position, being the lens limit state OFF and the second state, limiting the adjustment range of the focal position, being the lens limit state ON. This lens limit switch can be omitted when the operating member having the same function is disposed in the interchangeable lens 2.

The camera controller 41 can include a CPU 411, an AF control circuit 412, an image processing circuit 413, a memory control circuit 414, and a focus adjustment range setting circuit 415 as a control circuit for controlling the operation of the imaging apparatus 1.

The CPU 411 can be a controller configured to receive a transmitted instruction signal from the lens operation device 25 through the lens controller 26 or from the body operation device 40, and to control the operation of each of the blocks outside the camera controller 41 such as the optical system actuator 22, the aperture actuator 24, the shutter actuator 32, and the display drive circuit 37 and each of the control circuits inside the camera controller 41 in response to the instruction signal.

The AF control circuit 412 can control the AF processing by detecting the focus state in the imaging screen. In more detail, for example, the AF control circuit 412 can instruct the lens controller 26 while evaluating the contrast of the image data in accordance with the AF evaluation value as the focus detection information, whereby the AF control circuit 412 causes the lens controller 26 to control the optical system driver 22, and sets the focus lens of the optical system 21 to an in-focus state. In addition, a known AF system such as the phase difference system can be used.

The image processing circuit 413 can perform various kinds of image processing on an image data. The image processing can include the color correction processing, the gamma (γ) correction processing, the compression processing, and the like. In addition, the image processing circuit 413 can also perform the decompression processing on the compressed image data.

The memory control circuit 414 can be an interface for the CPU 411 and the like to perform the control for accessing the RAM 35, the memory card 38, and the ROM 39.

The focus adjustment range setting circuit 415 can switch the limit of adjustment range of the focal position during the AF control by the AF control circuit 412, in accordance with the lens limit state instructed to switch by the operation of the lens limit switch of the lens operation unit 25 or the body operation device 40. The details of the operation to switch the limit of the adjustment range of the focal position will be described below.

In addition, the camera controller 41 can also include an AE control circuit and the like calculating the object luminance by using the image data obtained by the imaging element IF circuit 34. The CPU 411 can calculate the opening amount of the aperture 23 during the exposure (aperture value), the opening time of the shutter 31 (shutter speed value), the imaging element sensitivity, the ISO sensitivity, and the like, in accordance with this object luminance.

Although any of the AF control circuit 412, the image processing circuit 413, the memory control circuit 414, and the focus adjustment range setting circuit 415 are configured as dedicated hardwares separate from the CPU 411, it may be configured so as to cause the CPU 411 to fulfill the functions of the respective circuits by using the control programs and control parameters recorded in the ROM 39.

Next, the operation of the imaging apparatus according to the embodiment of the present invention will be described. FIG. 2 is a flowchart illustrating the imaging operation of the imaging apparatus 1 according to this embodiment. The CPU 411 of the camera controller 41 can control the operation in FIG. 2 by reading the required program code from the ROM 39.

When the imaging apparatus 1 is powered on, the CPU 411 can read the required control parameters from the ROM 39 first, and can perform the initial setting on each of the blocks outside the camera controller 41 and each of the control circuits inside the camera controller 41 (step S1).

Then, the live view operation can be started (step S2). As the live view operation, after opening the shutter 31 by controlling the shutter actuator 32, the CPU 411 starts the imaging by the imaging sensor 33 by controlling the imaging sensor IF circuit 34. Then, the CPU 411 can input the image data stored in the work area of the RAM 35 as a result of imaging by the imaging sensor 33 into the image processing circuit 413 of the camera controller 41 to perform the image processing for live view display. Subsequently, the CPU 411 can input the image data on which the image processing for live view display is performed to the display drive circuit 37 to display the image on the display 36. The image of the object in front of the imaging apparatus 1 can be displayed as a moving image by such a display operation being repeatedly performed. The user can observe the object by this moving image display.

While continuing the live view operation, the CPU 411 can wait for the release button of the body operation device 40 being half-pressed (step S3).

Then, when the release button of the body operation device 40 is half-pressed, the CPU 411 can cause the focus adjustment range setting circuit 415 of the camera controller 41 to perform the focus limiter switching processing (step S4). The focus limiter switching processing, the details of which will be described below, can be a processing of switching the limit of the adjustment range of the focal position during the AF control by the AF control circuit 412 of the camera controller 41.

Thus, after the limit of the adjustment range of the focal position is switched by the focus adjustment range setting circuit 415, the CPU 411 can cause the AF control circuit 412 to perform the AF processing to focus on the object (step S5). The details of the AF processing will be described below.

Then, the CPU 411 can determine whether the release button of the body operation device 40 is fully pressed (step S6). Here, when the release button is determined not to be fully pressed, the CPU 411 can return the processing to the step S4 above. Thereby, the focus limiter switching processing and the AF processing in steps S4 and S5 can be repeated.

Then, when the release button is fully pressed, the CPU 411 can determine that the release button is fully pressed in step S6 above. In this case, the CPU 411 can perform imaging by using the imaging sensor 33 by controlling the shutter actuator 32 and the imaging sensor IF circuit 34 (step S7).

Then, the CPU 411 can return the processing to step S3 above.

Next, the focus limiter switching processing in step S4 above and the AF processing in step S5 above will be described.

First, the first state being the lens limit state OFF will be described.

As shown in FIG. 3A, the focus adjustment range setting circuit 415 can determine whether the lens limit state to be instructed to switch by the operation of the lens limit switch of the lens operation device 25 or the body operation device 40 is the first state being the lens limit state OFF (OFF) or the second state being the lens limit state ON (ON) (step S40).

Figure 4A:
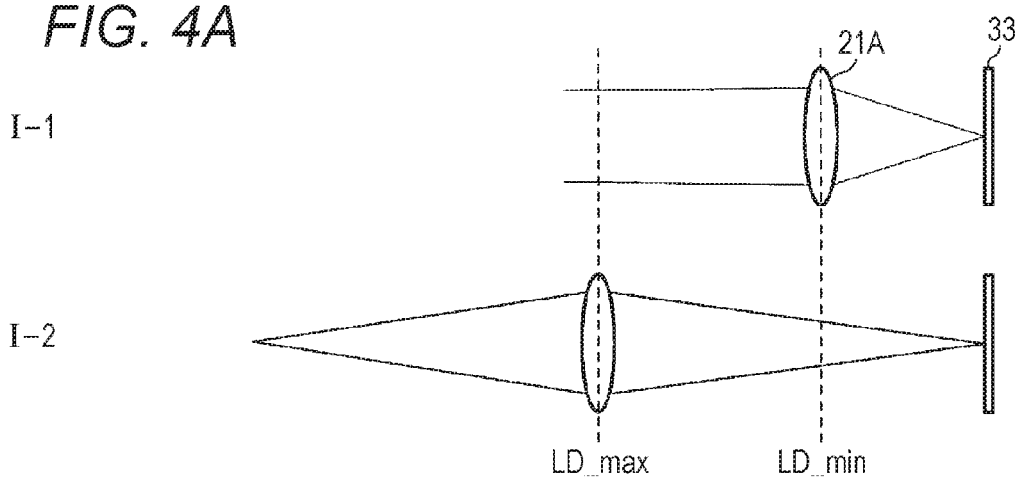
FIG. 4A is a schematic diagram for illustrating the moving range of the optical system when switched to the first state of lens limit state OFF.

When it is determined to be the first state being the lens limit state OFF (OFF), the focus adjustment range setting circuit 415 can clear (FLG=0) the flag FLG configured in the focus adjustment range setting circuit 415 or in the work area of the RAM 35 (step S41). The flag FLG can be cleared at the initial setting in step S1 above, and can be determined to be set (FLG=1) when it is switched from the first state to the second state. Then, the focus adjustment range setting circuit 415 can set the adjustment range (LD range) of the focal position to the whole driving range of the focus lens in the optical system 21 (step S42). That is, it can set the LD_max to the control parameter LD_hi representing the limit of the near end side of the LD range, and sets the LD_min to the control parameter LD_lo representing the limit of infinite end side of the LD range. That is, it can set the LD driving range by the number of pulses representing the position of the focus lens detectable by the optical system actuator 22 of the interchangeable lens 2. Here, the LD_max and LD_min are, as shown in FIG. 4A, the limits of the driving range of the focus lens (schematically shown as the focus lens 21A in FIG. 4A. Hereinafter, the same.) of the optical system 21. In addition, the state I-1 in FIG. 4A shows a state where the focus lens 21A is at the infinite end in the first state being the lens limit state OFF, and the state I-2 shows a state where the focus lens 21A is at the near end in the same first state.

It should be noted that the LD_max and LD_min may be stored as the control parameters in advance in the ROM 39, may also be stored in the work area of the RAM 35 by those stored in the lens controller 26 being received when the interchangeable lens 2 is mounted to the camera body 3, and if necessary, may be obtained by the communication with the lens controller 26.

Then, the focus adjustment range setting circuit 415 can cause the memory control circuit 414 to store the LD range being set (control parameters LD_hi and LD_lo) in a work area of the RAM 35 (step S43), and the processing can be finished.

As shown in FIG. 3B, the AF control circuit 412 can perform, for example, the distance measurement using the contrast of the image data evaluated in accordance with the AF evaluation value as the focus detection information and the current lens position of the focus lens of the optical system 21 transmitted from the lens controller 26, and can calculate the target LD position (control parameters LD_moku) where the focus lens is to be positioned (step S50). Then, the AF control circuit 412 can determine whether the lens limit state to be instructed to switch by the operation of the lens limit switch of the lens operation device 25 or the body operation device 40 is the first state being the lens limit state OFF (OFF) or the second state being the lens limit state ON (ON) (step S51).

When determining to be the first state being the lens limit state OFF (OFF), the AF control circuit 412 can transmit the target LD position calculated in step S50 above (control parameters LD_moku) to the lens controller 26. Thereby, the lens controller 26 can drive the focus lens of the optical system 21 to the target LD position represented by the control parameters LD_moku by controlling the optical system driver 22 (step S52). Then, the AF control circuit 412 can end the processing.

Next, the second state being the lens limit state ON will be described.

Figure 4B:
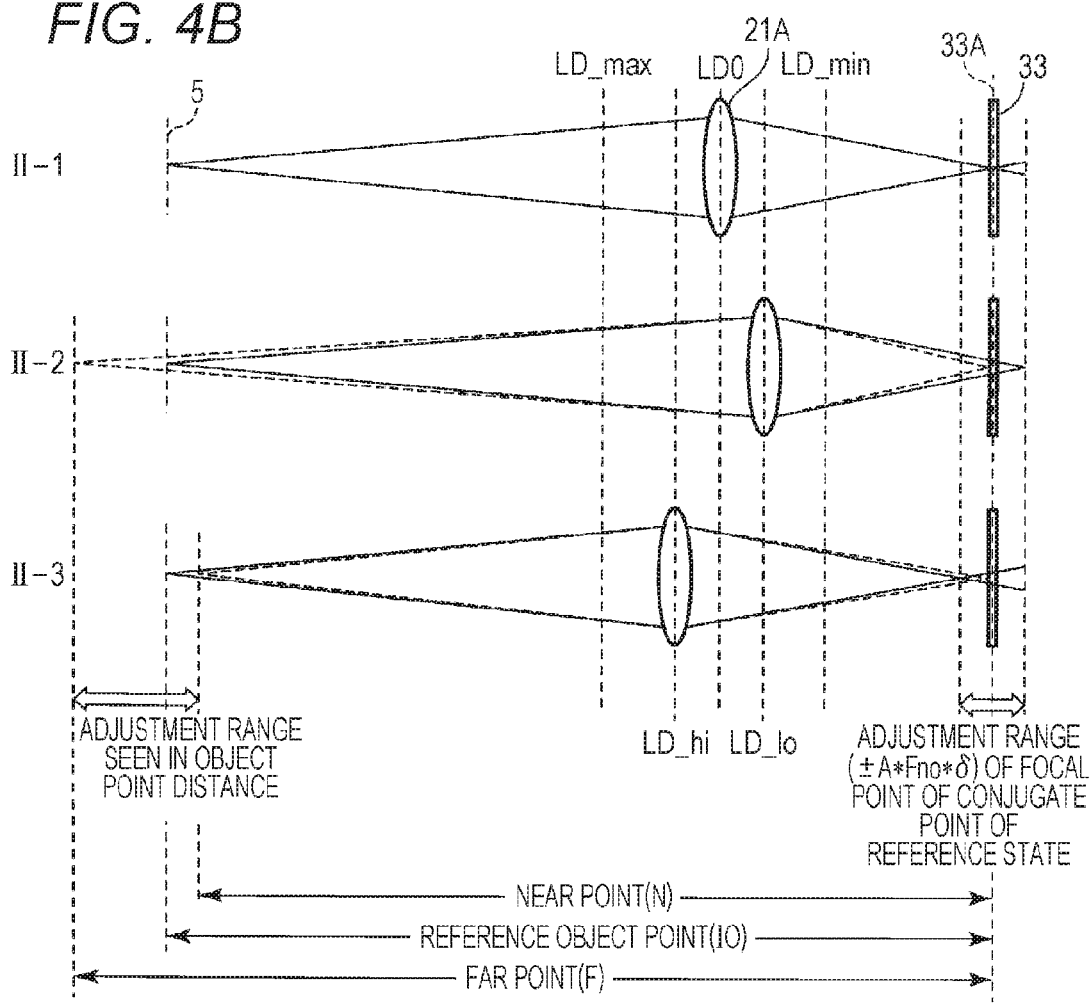

In step S40 above, when determining to be the second state being the lens limit state ON (ON), the focus adjustment range setting circuit 415 can determine whether the flag FLG is set (FLG=1) (step S44). Here, when the flag FLG is not set, in other words, the flag FLG is determined to be cleared (FLG=0), the focus adjustment range setting circuit 415 can set the flag FLG (FLG=1) (step S45), and furthermore, can cause the memory control circuit 414 to temporarily store the current lens position of the focus lens of the optical system 21 transmitted from the lens controller 26 (control parameters LD0) in a work area of the RAM 35 (step S46). The state II-1 in FIG. 4B shows a state when the switching operation is performed from the first state being the lens limit state OFF (OFF) to the second state being the lens limit state ON (ON), and this state can be set as the reference state. The reference state may adopt any state from the state I-1 to the state I-2 in FIG. 4A. There is a conjugate plane 5 on the object point side with respect to the imaging surface 33A of the imaging sensor 33 in the reference state.

Then, the focus adjustment range setting circuit 415 can load the control parameters A, Fno and δ stored in the ROM 39 or the work area of the RAM 35 by the memory control circuit 414 (step S47).

Here, the control parameter Fno is the F number of the optical system 21, and when the interchangeable lens 2 is mounted to the camera body 3, the control parameter stored in the lens controller 26 is received to be stored in a work area of the RAM 35. Alternatively, the F number of each type of the interchangeable lens 2 can be previously stored in the ROM 39 as the control parameter, and it may be configured to obtain the type of the interchangeable lens 2 by the communication with the lens controller 26.

Figure 5A:
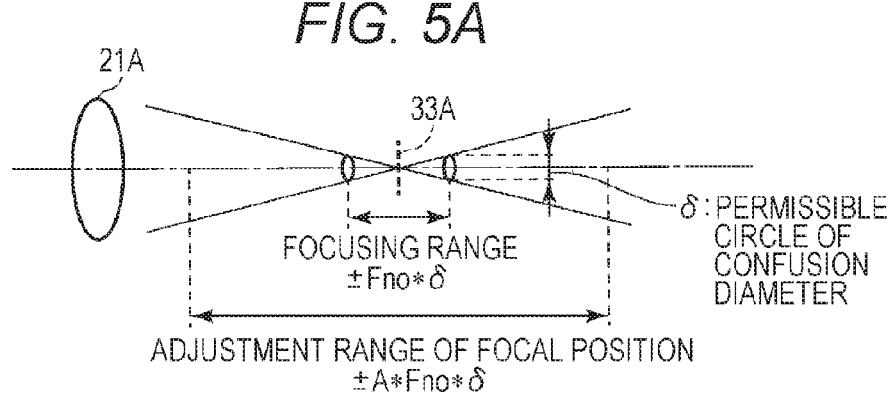
FIGS. 5A to 5C are schematic diagrams for illustrating the adjustment range of the focal position.

The control parameter δ is a permissible circle of confusion diameter as shown in FIG. 5A. Here, the permissible circle of confusion diameter means the diameter of the blur on the imaging plane 33A, and the permissible circle of confusion diameter indicates the blurred invisible limits. The permissible circle of confusion diameter can be, for example, $\frac{1}{30}$ mm in the 35 mm film camera. In the imaging apparatus where the film is not used, it can be determined by the pixel pitch of the imaging sensor 33, and can be set to $\frac{1}{30}$ mm in 35 mm film camera equivalent. The value obtained by multiplying F number of the optical system 21 by the permissible circle of confusion diameter (Fno*δ) can become the focusing range on the infinite end side or the near end side. Therefore, the double of the value (2*Fno*δ) can become the whole focusing range.

Figure 5B:
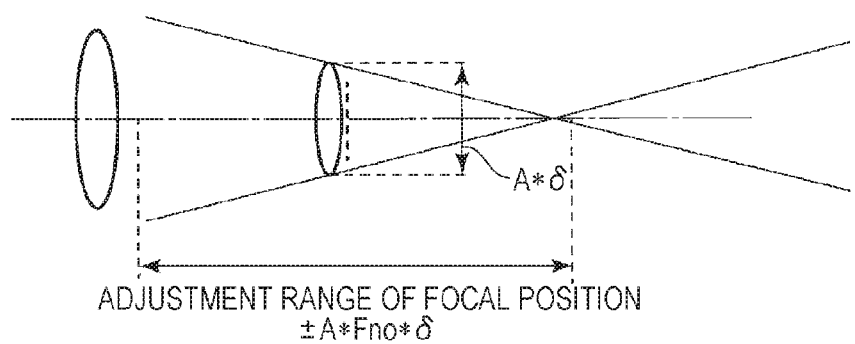
Figure 5C:
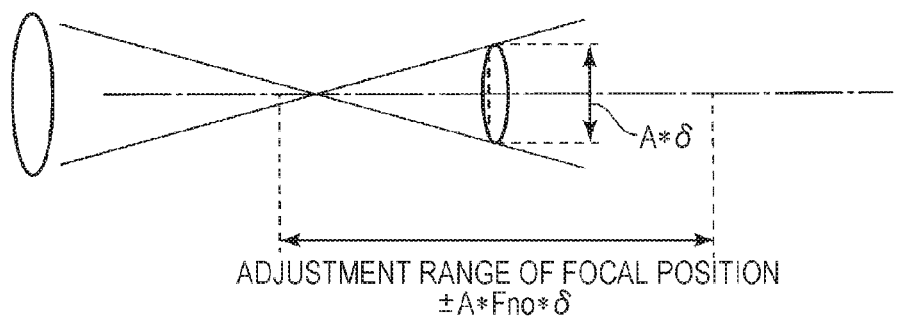

The control parameter A is a constant for determining the adjustment range of the focal position. This constant can be a value arbitrarily determined by the manufacturer of the imaging apparatus 1, similarly to the tint and the like. When this constant is 100 or less, what the object is can be determined even when blurred. In this embodiment, by the permissible circle of confusion diameter multiplied by this constant A (A*δ), the amount of blur at the focus limit ends, in other words, the infinite end side limit and the near end side limit of the adjustment range of the focal position can be defined. FIG. 5B shows the permissible circle of confusion diameter on the infinite end side of the adjustment range of the focal position, and FIG. 5C shows the permissible circle of confusion diameter on the near end side of the same.

The value (A*Fno*δ) obtained by multiplying the F number of the optical system 21 by the permissible circle of confusion diameter multiplied by this constant A (A*δ) can become the adjustment range of the focal position of the conjugate point in the reference state (defocus amount DEF) on the infinite end side or the near end side. In this embodiment, while the adjustment ranges of the focal point on the infinite end side and the near end side are set, including the reference state, the adjustment range can be specified to be the range where the imaging surface movement amount is substantially set equal with respect to the reference state. Therefore, the double of the value of the defocus amount DEF (2*A*Fno δ) can become the whole adjustment range of the focal position of the conjugate point in the reference state.

Then, the focus adjustment range setting circuit 415 can calculate the adjustment range of the focal position using the loaded control parameters A, Fno, and δ (step S48). That is, by calculating the A*Fno*δ, the adjustment range (defocus amount DEF) on the infinite end side or the near end side of the focal position of the conjugate point in the reference state can be obtained. This seeks that the maximum amount of blur in the adjustment range of the focal position does not change largely irrespective of the specifications and the state of the optical system 21, that is, this seeks the adjustment range of the focal position such that the circle of confusion diameter on the imaging plane is in a substantially constant range with respect to the conjugate object point to the imaging surface 33A in the reference state.

Then, the focus adjustment range setting circuit 415 can set the LD range (control parameters LD_hi and LD_lo) from the adjustment range (defocus amount DEF) on the infinite end side or the near end side of the focal position of the conjugate point in the reference state (step S49). Specifically, the adjustment range (defocus amount DEF) can be subtracted with respect to the lens position (control parameter LD0) of the focus lens of the optical system 21 in the reference state, temporarily stored in a work area of the RAM 35 in step S46 above, so that the image plane of the object point in the reference distance IO is −A*Fno*δ with respect to the imaging plane in the infinite end side state. In addition, the adjustment range (defocus amount DEF) can be added with respect to the lens position (control parameter LD0) of the focus lens of the optical system 21 in the reference state so that the image plane of the object point in the reference distance IO is +A*Fno*δ with respect to the imaging plane in the near end side state. However, the adjustment range can be a defocus amount DEF, and therefore, it can be converted DEF into the number of pulses representing the position of the focus lens, detectable by the optical system actuator 22 of the interchangeable lens 2. Therefore, here, the adjustment range (defocus amount DEF) can be multiplied by 1/k to be converted into the number of pulses, thereafter the addition or subtraction can be performed. That is, LD0+DEF/k can be calculated with respect to the control parameter LD_hi, and LD0−DEF/k can be calculated with respect to the control parameter LD_lo, whereby the LD range is set.

In this way, the infinity-side end can be set so that the imaging position where the conjugate plane 5 is set as the object point is −A*F*δ, and the near-side end can be set so that the imaging position where the conjugate plane 5 is set as the object point is +A*F*δ (the direction on the object side is the positive). The state II-2 in FIG. 4B shows the state of the infinity end in the second state being the lens limit state ON (ON), and the state II-3 shows the state of the near end in the same second state. When such an LD range is set, it can be set to the range where the near side is narrow and the far side is wide with respect to the object point conjugate with the reference position, and it can become blurred in the same degree both on the foreground blur side and the background blur side at the end points of the LD range.

Then, the focus adjustment range setting circuit 415 can cause the memory control circuit 414 to store the LD range being set (control parameters LD_hi and LD_lo) in a work area of the RAM 35 (step S43), and the processing is finished.

It should be noted that in step S44 above, if the flag FLG is determined to be set (FLG=1), the LD range (control parameters LD_hi and LD_lo) has been already set and stored, and therefore, the processing can be finished without performing anything.

On the other hand, if the second state being the lens limit state ON (ON) is determined in step S51 above, the AF control circuit 412 can cause the memory control circuit 414 to load the LD range (control parameters LD_hi and LD_lo) stored in the work area of the RAM 35 (step S53).

Then, the AF control circuit 412 can determine whether the target LD position calculated in step S50 above (control parameter LD_moku) is within the loaded LD range (control parameters LD_hi and LD_lo). That is, first, it can determine whether the target LD position (control parameter LD_moku) is greater than the limit of the near end side (control parameter LD_hi) of the LD range (LD_moku>LD_hi) (step S54), and if it is not greater, furthermore, it can determine whether the target LD position (control parameters LD_moku) is smaller than the limit of the infinite end side (control parameter LD_lo) of the LD range (LD_moku<LD_lo) (step S55). Then, if the AF control circuit 412 determines that the target LD position is not smaller than the limit of the infinite end side, the target LD position can be within the LD range, and therefore, the AF control circuit 412 can transmit the target LD position (control parameter LD_moku) to the lens controller 26, whereby the lens controller 26 controls the optical system actuator 22 and drives the focus lens of the optical system 21 to the target LD position indicated by the control parameter LD_moku (step S52).

In contrast to this, in step S54 above, if determining that the target LD position (control parameter LD_moku) is greater than the limit of the near end side of LD range (control parameter LD_hi) (LD_moku>LD_hi), the AF control circuit 412 can set the target LD position (control parameter LD_moku) to the limit of the near end side of the LD range (control parameter LD_hi) (step S56). Then, the process can proceed to step S52 above, and the target LD position (control parameter LD_moku) can be transmitted to the lens controller 26, whereby the lens controller 26 controls the optical system driver 22, and drives the focus lens of the optical system 21 to the target LD position represented by the control parameter LD_moku. Thus, the AF control circuit 412 can prevent the focus lens from moving beyond the limit of the near end side of the LD range.

In addition, in step S55 above, if determining that the target LD position (control parameter LD_moku) is smaller than the limit of the infinite end side of LD range (control parameter LD_lo) (LD_moku<LD_lo), the AF control circuit 412 can set the target LD position (control parameter LD_moku) to the limit of the infinite end side of the LD range (control parameter LD_lo) (step S57). Then, the process can proceed to step S52 above, and the target LD position (control parameter LD_moku) can be transmitted to the lens controller 26, whereby the lens controller 26 controls the optical system driver 22, and drives the focus lens of the optical system 21 to the target LD position represented by the control parameter LD_moku. Thus, the AF control circuit 412 can prevent the focus lens from moving beyond the limit of the infinite end side of the LD range.

The comparison can be made by using the number of pulses representing the position of the focus lens, however the comparison may be made by using the defocus amount DEF.

FIGS. 6A to 6E are each a diagram showing a calculation example of the adjustment range of the focal position. The optical system used in this numerical calculation example is calculated as a thin optical system, and although it does not necessarily coincide with the actual optical system, the tendency is the same. In these figures, the FL is the focal length of the optical system, and the reference object point (IO), the near point (N), and the far point (F) are as shown in FIG. 4B.

In this embodiment, as described above, the adjustment range of the focal position such that the circle of confusion diameter on the imaging surface 33A is within a certain range is sought, however, when seen in the object point distance, the adjustment range satisfying at least any one of the following features is set.

(1) As shown in FIG. 6A and the like, the object point distance range due to the adjustment range of the focal position is narrow on the near side and wide on the far side with respect to object point conjugate with the imaging surface 33A in the reference state.

(2) The object point distance range due to the adjustment range of the focal position can become narrower in the state where the magnification of the imaging surface 33A to the object point conjugate with the imaging surface 33A is large (for example, FIGS. 6A and 6B compared), and becomes wider in the state where the magnification is small (for example, FIGS. 6C and 6D compared).

(3) The object point distance range can become narrower when the F number of the optical system is bright (for example, FIGS. 6D and 6E compared), and can become wider when the F number is dark.

As described above, the automatic focus adjustment device according to the first embodiment includes: the lens limit switch of the lens operation device 25 or the body operation device 40 being a first operation unit switchable to a first state not limiting an adjustment range of a focal position and a second state limiting an adjustment range of a focal position; the focus adjustment range setting circuit 415 as an adjustment range setting unit of a focal position configured to set an adjustment range of a focal position to a whole region when switched to the first state by the lens limit switch, and to set an adjustment range of a focal position to a part of the region when switched to the second state; and the optical system 21 configured to adjust a focal position so as to focus in a range set by the focus adjustment range setting circuit 415, wherein the focus adjustment range setting circuit 415 sets the part of the region in a predetermined range by setting a state when switched to the second state by the lens limit switch as a reference state, with reference to a focal position of the optical system 21 in an imaging position of an object point (conjugate plane 5) conjugate with an imaging plane 33A in the reference state.

In addition, the automatic focus adjustment control device according to the first embodiment includes:

the focus adjustment range setting circuit 415 as an adjustment range setting unit of a focal position configured to set an adjustment range of a focal position to a whole region when switched to the first state in response to an instruction from the lens limit switch of the lens operation device 25 or the body operation device 40 being a first operation unit switchable to a first state not limiting the adjustment range of the focal position and a second state limiting the adjustment range of the focal position, and to set the adjustment range of the focal position to a part of the region when switched to the second state; and the AF control circuit 412 as a control command output unit configured to output a control command to the optical system 21 adjusting a focal position so as to focus in a range set by the focus adjustment range setting circuit 415, wherein the focus adjustment range setting circuit 415 sets the part of the region in a predetermined range by setting a state when switched to the second state in response to an instruction from the lens limit switch as a reference state, with reference to a focal position of the optical system 21 in an imaging position of an object point (conjugate plane 5) conjugate with an imaging plane 33A in the reference state.

Therefore, the automatic focus adjustment device and the automatic focus adjustment control device according to the first embodiment sets the adjustment range of the focal position in a predetermined range with reference to the focal position of the optical system 21 when switched to the second state, and therefore, the focus adjustment range can be set in any region. Furthermore, the adjustment range of the focal position is set in a predetermined range with reference to the focal position of the optical system when switched to the second state, in other words, set to be constant, rather than the object point distance region, that is, the focus adjustment range on the imaging plane 33A side can be set to be constant whereas the adjustment range of the focus is different on the object point side, and therefore, the image is not blurred largely in the adjustment range of the focal position.

Thus, the present embodiment can be used in the following scenes.

As shown in FIG. 7A, in the case where the bird in the trees is imaged, even when switched from the first state to the second state in the approximately in-focus state, it is possible to prevent the focal position from flying to the distant landscape or to the foreground even if the re-focus is performed.

As shown in FIG. 7B, in the case where the distant landscape is imaged, when switched from the first state to the second state in the approximately in-focus state, it is possible to prevent the focal position from flying to the foreground even if the re-focus is performed.

As shown in FIG. 7C, in the case where the flower in near field is imaged, when switched from the first state to the second state in the approximately in-focus state, it is possible to prevent the focal position from flying to the background even if the re-focus is performed. That is, when a flower in the near field is imaged as the center and the distant landscape is imaged as the blurred background initially, there is a case where the distant landscape is suddenly focused and the flower is suddenly not focused although the flower is required to be focused, however, this can be suppressed in this embodiment.

In this embodiment, the range on the focal point side can be specified with reference to the lens position at the time of switching, and therefore, the limit can be applied by the visual blur amount. There is not any switching point determined by the object point distance either, and therefore, the region of the adjustment range of the focal position can be easily selected. In addition, it is possible to specify a range narrower than the conventional focus limit region. Therefore, the large blur state can be prevented even if the limiter is specified in a telephoto lens or the like.

Second Embodiment

A second embodiment will be described. The configuration example according to the second embodiment and some of the operations according to the second embodiment are similar to those in the first embodiment, and those similar elements are marked with the same reference numerals as those in the first embodiment, and the description thereof will be omitted.

The imaging apparatus 1 to which the automatic focus adjustment device and automatic focus adjustment control apparatus according to the second embodiment are applied includes a first operation unit capable of switching to a first state not limiting the adjustment range of the focal position, and a second state limiting the adjustment range of the focal position, and further includes a second operation unit capable of switching to a third state not limiting the adjustment range of the focal position, and a fourth state limiting the adjustment range of the focal position.

The second operation unit may include a second lens limit switch in the lens operation device 25 or the body operation device 40, apart from the lens limit switch in the lens operation device 25 or the body operation device 40 as the first operation unit.

Alternatively, it is also possible to use a lens limit switch as the first operation unit. In this case, for example, the lens limit switch is configured as a slide switch biased to return to the neutral point unless a load is applied, and is switchable to the first state when it is in the neutral point as the initial state, switchable to the second state when it is slid to one side from the neutral point, switchable to the third state when it is slid to the other side from the neutral point in this second state, and switchable to the fourth state when it is again slid to the one side from the neutral point in the second state. In addition, the lens limit switch is configured as a push-button switch, and may be configured as switchable to the first state when it is not pressed as the initial state, switchable to the second state when it is pressed once, switchable to the third state when it is pressed long in the second state, and switchable to the fourth state when it is again pressed once in the second state. This embodiment is not limited to this configuration.

Then, the focus adjustment range setting circuit 415 being the adjustment range setting unit of the focal position can set the adjustment range of the focal position in a predetermined range with reference to the focal position of the optical system 21 when switched to the fourth state by the lens limit switch as the second operation unit, when it is in a state of being switched to the second state by the lens limit switch as the first operation unit, and furthermore switched to the fourth state by the lens limit switch as the second operation unit.

Specifically, as shown in FIG. 8A, step S8 where the CPU 411 can cause the focus adjustment range setting circuit 415 to perform the reference position re-setting processing is added between the AF processing in step S5 and the full-press determination of the release button in step S6.

In the reference position re-setting processing in step S8, as shown in FIG. 8B, first, the focus adjustment range setting circuit 415 can determine whether the flag FLG configured in the focus adjustment range setting circuit 415 or the work area in the RAM 35 is set (FLG=1) (step S80). This flag FLG can be set when it is in the second state described above. Therefore, when this flag FLG is determined not to be set, the focus adjustment range setting circuit 415 can end the processing.

In contrast to this, when the flag FLG is determined to be set, the focus adjustment range setting circuit 415 can determine whether the lens limit state to be instructed to switch by the operation of the lens limit switch as the second operation unit is the third state being the lens limit state OFF (OFF) or the fourth state being the lens limit state ON (ON) (step S81).

Then, when it is determined to be the third state being the lens limit state OFF (OFF), the focus adjustment range setting circuit 415 can clear (FLG=0) the flag FLG configured in the focus adjustment range setting circuit 415 or in the work area of the RAM 35 (step S82). Then, the focus adjustment range setting circuit 415 can set the adjustment range (LD range) of the focal position to the whole driving range of the focus lens in the optical system 21 (step S83). That is, the focus adjustment range setting circuit 415 can set the LD_max to the control parameter LD_hi representing the limit of the near end side of the LD range, and can set the LD_min to the control parameter LD_lo representing the limit of infinite end side of the LD range. Then, the focus adjustment range setting circuit 415 can cause the memory control circuit 414 to store the LD range being set (control parameters LD_hi and LD_lo) in a work area of the RAM 35 (step S84), and the processing is finished.

In addition, in step S81 above, when it is determined to be the fourth state being the lens limit state ON (ON), the focus adjustment range setting circuit 415 can cause the memory control circuit 414 to temporarily store the current lens position of the focus lens of the optical system. 21 transmitted from the lens controller 26 (control parameter LD0) in a work area of the RAM 35 (step S85). Then, the focus adjustment range setting circuit 415 can load the control parameters A, Fno and δ stored in the ROM 39 or the work area of the RAM 35 by the memory control circuit 414 (step S86), and can calculate the adjustment range of the focal position by using the loaded control parameters A, Fno and δ (step S87). That is, by calculating the A*Fno*δ, the adjustment range (defocus amount DEF) on the infinite end side or the near end side of the focal position of the conjugate point in the reference state can be obtained. Then, the focus adjustment range setting circuit 415 can set the LD range (control parameters LD_hi and LD_lo) from the adjustment range (defocus amount DEF) on the infinite end side or the near end side of the focal position of the conjugate point in the reference state (step S88). Specifically, LD0+DEF/k can be calculated with respect to the control parameter LD_hi, and LD0−DEF/k is calculated with respect to the control parameter LD_lo, whereby the LD range is set. Then, the focus adjustment range setting circuit 415 can cause the memory control circuit 414 to store the LD range being set (control parameters LD_hi and LD_lo) in a work area of the RAM 35 (step S84), and the processing is finished.

As described above, the automatic focus adjustment device according to the second embodiment can further include a second operation unit switchable to the third state not limiting the adjustment range of the focal position and the fourth state limiting the adjustment range of the focal position, and the focus adjustment range setting circuit 415 being the adjustment range setting unit of the focal position sets the adjustment range of the focal position in a predetermined range with reference to the focal position of the optical system 21 when switched to the fourth state by the second operation unit, when in a state of being switched to the second state by the first operation unit, and furthermore switched to the fourth state by the second operation unit.

In addition, in the automatic focus adjustment control device according to the second embodiment, the focus adjustment range setting circuit 415 being the adjustment range setting unit of the focal position sets the adjustment range of the focal position in a predetermined range with reference to the focal position of the optical system 21 when switched to the fourth state in response to an instruction from the second operation unit, when switched to the fourth state in a state of being switched to the second state in response to an instruction from the first operation unit, furthermore, in response to an instruction from the second operation unit switchable to the third state not limiting the adjustment range of the focal position and the fourth state limiting the adjustment range of the focal position.

Therefore, the automatic focus adjustment device and the automatic focus adjustment control device according to this second embodiment can re-set the adjustment range of the focal position. Therefore, the method of use such as after focusing on the object by once setting the adjustment range in the rough position, setting the state where the object is in-focus as a new reference state, and focusing by tracking the movement of the object can be realized.

Although the control parameter A is described as the value set arbitrarily by the manufacturer of the imaging apparatus 1 in the above-described first and second embodiments, a selection unit selectable to any one of A1 to An (n is a constant of two or more) may be provided in the lens operation device 25 or the body operation device 40, and may be selectable by the operator.

In addition, although the imaging apparatus 1 to which the automatic focus adjustment device and the automatic focus adjustment control device are applied is described as the interchangeable lens type camera where the interchangeable lens 2 and the camera body 3 are provided as separate bodies, however it is obvious that this camera may be a single-lens reflex system camera where the mirror is driven during the imaging. Furthermore, as described in the first embodiment, it can also be applied to an imaging apparatus integrated with a lens where the lens is provided integrally with the camera body 3. In addition, it is also applicable to a smart phone with a camera function and a lens style camera.

In addition, the optical system 21 may also be any one of a single lens, a cemented lens, a lens group, and the like.

Furthermore, although the focusing operation is described as performed by the lens drive, it may be performed by a refractive power variable element.

Thus, the present invention is not intended to be limited to the above-described embodiment as it is, and it can be embodied by modifying components without departing from the gist thereof in the implementation phase. In addition, it is possible to form various inventions by combining suitably a plurality of components disclosed in the embodiments. For example, some components may be deleted from all the components disclosed in the embodiments. Furthermore, the components in different embodiments may be appropriately combined. Thus, it is obvious that various modifications and applications are possible within a range not departing from the gist of the invention.

In addition, each processing by the imaging apparatus 1 in the embodiment described above may be stored as an executable program. This program can load the program stored in the storage medium of the external storage device such as a memory card (ROM card, RAM card, etc.), a magnetic disk (floppy disc (registered trademark), hard disk, etc.), an optical disk (CD-ROM, DVD, etc.), and a semiconductor memory, and the processing described above can be performed by the operation being controlled by the loaded program.

What is claimed is:

1. An automatic focus adjustment device comprising:
   an optical system configured to be controlled to adjust a focal position so as to focus in an adjustment range;
   a first switch configured to be switched between a first state and a second state; and
   a processor comprising hardware, wherein the processor is configured to:
      set the adjustment range of the focal position to a first range in the first state;
      set the adjustment range of the focal position to a second range in the second state, wherein the second range is narrower than the first range, the second range is determined as a predetermined range from a reference focal position, and the reference focal position is a focal point of an object point conjugate with an imaging surface at the time the first switch is switched to the second state; and
      control the optical system to adjust the focal position in a selected one of the first range and the second range.

2. The automatic focus adjustment device according to claim 1, wherein the processor is further configured to set an object point distance range from a farthest side to a nearest side, the distance from the farthest side to the object point conjugate with the imaging surface is longer than the distance from the nearest side to the object point conjugate with the imaging surface.

3. The automatic focus adjustment device according to claim 1, wherein the processor is further configured to set an object point distance range based on a magnification with respect to the object point conjugate with the imaging surface, the object point distance range being narrow when the magnification is big, the object point distance range being large when the magnification is small.

4. The automatic focus adjustment device according to claim 1, wherein the processor is further configured to set the focal position so that the adjustment range becomes wider when a F number of the optical system is dark, rather than when bright.

5. The automatic focus adjustment device according to claim 1, wherein the processor is further configured to set the adjustment range so that a circle of confusion diameter on the image surface with respect to the object point conjugate with the imaging surface at the time the first switch is switched to the second state is in an approximately constant range irrespective of a state of the optical system and a specification.

6. The automatic focus adjustment device according to claim 1, wherein the processor is further configured to set the predetermined range based on a permissible circle of confusion diameter of the optical system and a F number of the optical system.

7. The automatic focus adjustment device according to claim 6, wherein the processor is further configured to set the predetermined range as:

$-A*Fno*\delta < Def < A*Fno*\delta$ wherein:
the A is a predetermined constant,
the Fno is the F number of the optical system,
the $\delta$ is the permissible circle of confusion diameter, and
the Def is the predetermined range (where, the direction on the object point is positive).

8. The automatic focus adjustment device according to claim 7, wherein the predetermined constant A is a value of 100 or less.

9. The automatic focus adjustment device according to claim 7, further comprising:
an input device configured to receive an input of any one of A1 to An (n is a constant of two or more) as the predetermined constant A.

10. The automatic focus adjustment device according to claim 1, further comprising:
a second switch configured to switch between a third state and a fourth state,
wherein the processor is further configured to determine the part of the whole region as the predetermined range from the focal position of the object point conjugate with the imaging surface at the time the second switch is switched to the fourth state after the first switch is switched to the second state.

11. An automatic focus adjustment control device for operating an optical system configured to be controlled to adjust a focal position so as to focus in an adjustment range based on a state of a first switch configured to switch between a first state and a second state,
wherein the automatic focus adjustment control device comprises:
a processor comprising hardware, wherein the processor is configured to:
set the adjustment range of the focal position to a first range in the first state;
set the adjustment range of the focal position to a second range in the second state, wherein the second range is narrower than the first range, the second range is determined as a predetermined range from a reference focal position, and the reference focal position is a focal point of an object point conjugate with an imaging surface at the time the first switch is switched to the second state; and
control the optical system to adjust the focal position in a selected one of the first range and the second range.

12. The automatic focus adjustment control device according to claim 11,
wherein the processor further operates the optical system based on a state of a second switch configured to be switched between a third state and a fourth state, and
wherein the processor is further configured to determine the part of the whole region as the predetermined range from the focal position of the object point conjugate with the imaging surface at the time the second switch is switched to the fourth state after the first switch is switched to the second state.

13. A non-transitory computer-readable storage device storing instructions that cause a computer to operate an optical system configured to be controlled to adjust a focal position so as to focus in an adjustment range based on a state of a first switch configured to be switched between a first state and a second state,
wherein the instructions, when executed by at least one processor, causes the processor to at least:
set the adjustment range of the focal position to a first range in the first state;
set the adjustment range of the focal position to a second range in the second state, wherein the second range is narrower than the first range, the second range is determined as a predetermined range from a reference focal position, and the reference focal position is a focal point of an object point conjugate with an imaging surface at the time the first switch is switched to the second state; and
control the optical system to adjust the focal position in a selected one of the first range and the second range.

14. The non-transitory computer-readable storage device according to claim 13, wherein:
the instructions are further for operating the optical system based on a state of a second switch configured to be switched between a third state and a fourth state, and
the instructions, when executed by the at least one processor, causes the at least one processor to further:
determine the part of the whole region as the predetermined range from the focal position of the object point conjugate with the imaging surface at the time the second switch is switched to the fourth state after the first switch is switched to the second state.

* * * * *